United States Patent [19]

Fricke et al.

[11] Patent Number: 5,891,580
[45] Date of Patent: Apr. 6, 1999

[54] USE OF AQUEOUS POLYURETHANE DISPERSIONS AS ADHESIVES FOR LAMINATED FILMS

[75] Inventors: Hans-Joachim Fricke, Dirmstein; Karl Haeberle, Speyer; Lothar Maempel, Bruehl; Fritz Peikert, Frankenthal; Eckehardt Wistuba, Bad Duerkheim, all of Germany

[73] Assignee: BASF Aktiengesellschaft, Ludwigshafen, Germany

[21] Appl. No.: 843,128

[22] Filed: Apr. 28, 1997

Related U.S. Application Data

[63] Continuation of Ser. No. 517,192, Aug. 21, 1995, abandoned, which is a continuation of Ser. No. 202,454, Feb. 28, 1994, abandoned.

[30] Foreign Application Priority Data

Mar. 13, 1993 [DE] Germany .......................... 43 08 079.0

[51] Int. Cl.⁶ .................................................. B32B 27/00
[52] U.S. Cl. ..................... 428/424.8; 156/331.4; 156/331.7; 521/40; 524/591; 528/71
[58] Field of Search .............................. 156/331.7, 331.4; 524/591; 528/71; 521/40; 428/424.8

[56] References Cited

U.S. PATENT DOCUMENTS

| 4,240,861 | 12/1980 | Meckel et al. ........................ 156/331.7 |
| 4,540,633 | 9/1985 | Kucera et al. ........................ 156/331.7 |
| 5,135,963 | 8/1992 | Haeberle . |
| 5,342,915 | 8/1994 | Licht et al. .............................. 528/71 |

FOREIGN PATENT DOCUMENTS

| 0 441 196 A2 | 8/1991 | European Pat. Off. . |
| 0 498 218 | 8/1992 | European Pat. Off. . |
| 1495745 | 6/1969 | Germany . |
| 26 60 346 | 1/1980 | Germany . |
| 1076688 | 7/1967 | United Kingdom ................... 524/591 |

Primary Examiner—John J. Gallagher
Attorney, Agent, or Firm—Oblon, Spivak, McClelland, Maier & Neustadt, P.C.

[57] ABSTRACT

Aqueous dispersions containing a polyurethane which contains less than 0.6% by weight, based on the polyurethane, of urea groups

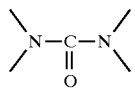

are used as adhesives.

14 Claims, No Drawings

USE OF AQUEOUS POLYURETHANE DISPERSIONS AS ADHESIVES FOR LAMINATED FILMS

This application is a Continuation of application Ser. No. 08/517,192, filed on Aug. 21, 1995, abandoned, which is a Continuation of application Ser. No. 08/202,454, filed on Feb. 28, 1994, abandoned.

The present invention relates to the use of aqueous polyurethane dispersions as adhesives, in particular adhesives for laminated films.

By adhesively bonding or laminating films of different materials, the properties of these materials are combined. The aim of such a measure may be to achieve particular decorative effects, or technical effects such as the protection of a print, the production of boil-resistant laminated films, prevention of vapor diffusion, heat-sealability, reliable avoidance of porousness or resistance to corrosive materials. The film materials essentially used are polyethylene, polypropylene, in particular biaxially oriented polypropylene, polyamide, polyester, PVC, cellulose acetate, cellophane and metals, such as tin or aluminum.

Conventionally used laminating adhesives are, for example, binders or binder systems which are dissolved in organic solvents and crosslink by reactions of polyisocyanate compounds with hydroxyl-containing polyesters or polyethers or with the action of water on polyisocyanate compounds.

The solvents generally used are gasoline, toluene, acetone and ethyl acetate. However, the use of such solutions as laminating adhesives presents problems and is technically complicated since these solvents constitute a fire hazard and explosion-proof coating units therefore have to be used and apparatuses for recovering the solvents are required. Furthermore, residual solvents in the laminates impair the goods to be packaged by affecting the taste and odor.

These systems are in general 2-component systems since the reactive components cannot be mixed until shortly before use, in order to avoid premature crosslinking reactions.

The use of aqueous polyurethane dispersions as adhesives, including laminating adhesives, has been disclosed in DE-A-14 95 745. However, polyurethane dispersions known to date do not result in sufficiently strong bonding without the addition of a crosslinking agent. When a crosslinking agent is added, the laminate cannot be readily separated again for recycling materials. By adding crosslinking agents, for example isocyanate crosslinking agents, the shelf life is adversely affected, ie. the pot life of the dispersions is shortened.

EP-A-441 196 discloses aqueous dispersions of polyurethanes which have a low urea content and are composed of diisocyanates, dihydric polyether alcohols and dimethylolpropionic acid. The dispersions described there are used for coating leather.

It is an object of the present invention to provide one-component polyurethane dispersions which are suitable as adhesives, in particular laminating adhesives, and result in a strong bond. It should be possible to separate the laminate at high temperatures to permit recycling of the individual materials.

We have found that this object is achieved by using, as adhesives, aqueous dispersions containing a polyurethane which contains less than 0.6% by weight, based on the polyurethane, of urea groups

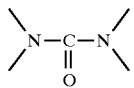

The polyurethane which, according to the invention, is used in the form of an aqueous dispersion as an adhesive contains, as components, essentially organic isocyanate compounds a), dihydroxy compounds b), monohydric to trihydric alcohols having an ionic group or a group convertible into an ionic group c) and, if required, alcohols d) and monohydric polyether alcohols e).

Suitable organic isocyanate compounds are aliphatic, aromatic and araliphatic diisocyanates, such as tetramethylene diisocyanate, hexamethylene diisocyanate, dodecamethylene diisocyanate, 1,4-diisocyanatocyclohexane, 4,4'-di-(isocyanatocyclohexyl)-methane, trimethylhexane diisocyanate, 1-isocyanato-3,3,5-trimethyl-5-isocyanatomethylcyclohexane (isophorone diisocyanate), 2,4-diisocyanatotoluene, 2,6-diisocyanatotoluene, tetramethylxylylene diisocyanate, 1,4-diisocyanatobenzene, 4,4'-diisocyanatodiphenylmethane, p-xylylene diisocyanate and isopropenyl dimethyltoluylene diisocyanate. Furthermore, polyisocyanates which are derived from these diisocyanates, have a higher functionality and contain carbodiimide, allophanate, isocyanurate, urethane and/or biuret groups, and monoisocyanates, such as phenyl isocyanate, cyclohexyl isocyanate, hexyl isocyanate or dodecyl isocyanate, may also be used.

The isocyanate compounds a) are preferably diisocyanates, in particular 2,4- and 2,6-diisocyanatotoluene and mixtures thereof, hexamethylene diisocyanate, 1-isocyanato-3,3,5-trimethyl-5-isocyanatomethylcyclohexane and 4,4'-di-(isocyanatocyclohexyl)-methane. For the preparation of products which do not yellow under the action of light, aliphatic isocyanate compounds are preferably used.

Suitable dihydroxy compounds (b) having a molecular weight of from more than 500 to 5,000 are the known polyesters, polyethers, polythioethers, polylactones, polyacetals, polycarbonates and polyesteramides having 2 hydroxyl groups. Dihydroxy compounds whose molecular weight is from 750 to 3,000 are preferred. Mixtures of these dihydroxy compounds can of course also be used.

Preferably used dihydroxy compounds are dihydric polyether alcohols, as obtainable, for example, by polymerization of ethylene oxide, propylene oxide, butylene oxide, tetrahydrofuran, styrene oxide or epichlorohydrin with themselves, for example in the presence of boron trifluoride, or by an addition reaction of these compounds, if necessary as a mixture or one after the other, with initiator components having reactive hydrogen atoms, such as amines or alcohols. Particularly suitable monomers II are polyetherdiols which contain at least 70% by weight of identical or different units having the structure

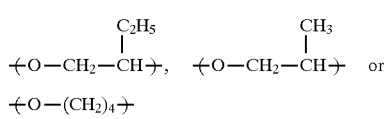

The amount of dihydroxy compounds b) corresponds preferably to 0.2–0.8, particularly preferably 0.3–0.6, equivalent of OH groups, based on 1 equivalent of NCO groups of the compounds a).

Component (c) contains ionic groups or groups convertible into ionic groups, in order to ensure the dispersibility of the polyurethane in water. Their amount is usually from 0.2 to 0.8, preferably from 0.3 to 0.7, gram equivalent, based on 1 mol of isocyanate groups.

Examples of groups convertible into ionic groups are in particular carboxyl groups, sulfo groups and tertiary amino groups.

Dihydroxycarboxylic or dihydroxysulfonic acids of 4 to 10 carbon atoms are preferably used as components c). Particularly preferred are dihydroxycarboxylic acids of 5 to 10 carbon atoms and of the general formula

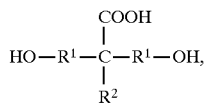

where $R^1$ is alkylene and $R^2$ is alkyl, in particular dimethylolpropionic acid.

For the conversion of potential anionic groups, for example carboxyl groups or sulfo groups, into ionic groups, inorganic and/or organic bases, such as sodium hydroxide, potassium hydroxide, potassium carbonate, sodium bicarbonate, ammonia or primary, secondary and in particular tertiary amines, eg. triethylamine or dimethylaminopropanol, may be used.

For the conversion of potential cationic groups, for example the tertiary amino groups, into the corresponding cations, for example ammonium groups, suitable neutralizing agents are inorganic acids, for example hydrochloric acid, or acetic acid, fumaric acid, maleic acid, lactic acid, tartaric acid, oxalic acid or phosphoric acid, and suitable quaternizing agents are, for example, methyl chloride, methyl iodide, dimethyl sulfate, benzyl chloride, ethyl chloroacetate or bromoacetamide. Further suitable neutralizing or quaternizing agents are described, for example, in U.S. Pat. No. 3,479,310, column 6.

The neutralization or quaternization of the ionic groups or of the potentially ionic groups can be carried out before, during or, in particular, after the isocyanate polyaddition reaction.

Components d) are, for example, 1,2-ethanediol, 1,2- and 1,3-propanediol, butanediols, 1,4-butenediol, 1,4-butynediol, pentanediols, hexanediols, octanediols, 1,4-bishydroxymethylcyclohexane, 2,2-bis-(4-hydroxycyclohexyl)-propane, 2-methyl-1,3-propanediol, glycerol, trimethylolpropane, 1,2,6-hexanetriol, 1,2,4-butanetriol, pentaerythritol, sorbitol, diethylene glycol, triethylene glycol, tetraethylene glycol, dipropylene glycol or dibutylene glycol.

Monohydric alcohols or alcohols which are higher than dihydric may also be present in mixtures of the components d). However, dihydric alcohols d) are preferably used.

The amount of the compounds d) preferably corresponds to 0–0.4 equivalent of OH, based on 1 equivalent of OCN.

Monohydric polyether alcohols whose number average molecular weight ($\overline{M}_n$) is from 500 to 10,000, preferably from 1,000 to 5,000, are of particular interest as compounds e) which may be present. They are obtainable, for example, by alkoxylation of monohydric alkanols, such as methanol, ethanol or n-butanol, for example ethylene oxide or propylene oxide being used as the alkoxylating agent. The degree of ethoxylation of the monomers V is preferably more than 60% by weight.

Further suitable components are compounds having primary or secondary amino groups which react with isocyanate to give urea groups, said compounds being present in small amounts.

Urea groups are also formed by the reaction of isocyanate groups with water to give amines and subsequent reaction of the amines with further isocyanate groups to give urea groups. To avoid such urea formation, the components are preferably used in amounts such that the isocyanate groups are substantially reacted with hydroxyl groups.

The ratio of the total number of all OH equivalents of components b) to e) to the number of equivalents of OCN is preferably from 0.94:1 to 1.02:1, particularly preferably 1:1.

The total content of urea groups in the polyurethane should not exceed 0.6, preferably 0.3, particularly preferably 0.2, % by weight, and very particularly preferably should be close to 0 or 0.

The preparation of the aqueous polyurethane dispersions is advantageously carried out by a procedure in which the components, in the melt or in the presence of an inert, water-miscible solvent, such as acetone, tetrahydrofuran, butanone or N-methylpyrrolidone, are reacted at from 20° to 160° C., preferably from 50° to 100° C. By the concomitant use of substances having a conventional catalytic action, such as dibutyltin dilaurate, tin(II) octoate or 1,4-diazabicyclo[2.2.2]octane, usually in amounts of from 10 to 1,000 ppm, based on the polyurethane, the reaction can be accelerated. If necessary, dilution is then effected with a water-miscible solvent, groups present in components c) and convertible into ionic groups are, if required, ionized by neutralization or quaternization, and water is added.

Thereafter, the organic solvents which may be present are usually distilled off, and it is for this reason that preferred solvents are those whose boiling point is below the boiling point of water. If components having primary or secondary amino groups are incorporated in the polyurethane V, they are added to the resulting aqueous reaction mixture thereof, preferably by stirring in at from 20° to 50° C. The amount of water added is usually such that the novel aqueous polyurethane formulations have a solids content of from 10 to 60% by weight. The polyurethanes present in the formulations have a K value of, as a rule, from 20 to 60, in N,N-dimethylformamide (DMF).

The K value is a relative viscosity number which is determined similarly to DIN 53,726 at 25°. It expresses the flow rate of a 1% strength by weight solution of the polyurethane in DMF relative to the flow rate of pure DMF and characterizes the average molecular weight of the polyurethane.

For the novel use as an adhesive, in particular a laminating adhesive, the dispersions may, for example, also contain specific assistants and additives customary in adhesives technology. These include, for example, thickeners, plasticizers or tackifiers, for example natural resins or modified resins, such as rosin esters, or synthetic resins, such as phthalate resins.

In the case of use as a laminating adhesive, in general sheet-like substrates, for example films, are adhesively bonded to paper or cardboard. The polyurethane dispersions are particularly suitable as adhesives for the production of laminated films, different films being adhesively bonded to one another for various purposes, as described at the outset.

The film materials essentially used are polyethylene, polypropylene, in particular biaxially oriented polypropylene, polyamide, polyester, PVC, cellulose acetate, cellophane and metals, such as tin and aluminum.

The polymer films, in particular polyolefin films, can, if required, be corona-pretreated.

The polyurethane dispersion is applied to at least one, in general only to one, of the substrates to be adhesively bonded. The coated substrates are generally briefly dried and then pressed together or with uncoated substrates, preferably at from 30° to 80° C.

The adhesive bond obtained, in particular the laminated film obtained, has a strong bond at room temperature, as otherwise achievable in general only in the case of two-component systems with the use of a crosslinking agent.

At high temperatures, from about 60° C., the strength of the bond decreases. From about 100° C., for example in boiling water, the laminates can in general be readily separated. This permits separate recycling of the different films in the laminate.

An increase in the strength of the bond even at high temperatures can be achieved, for example, by adding crosslinking agents having free isocyanate groups.

EXAMPLES

Example 1

A mixture of 34.8 g of 2,4-diisocyanatotoluene (0.2 mol), 8.7 g of 2,6-diisocyanatotoluene (0.05 mol), 200 g of polypropylene glycol (OH number 56, 0.1 mol), 20.1 g of dimethylolpropionic acid (0.15 mol) and 0.1 g of dibutyltin dilaurate was reacted for 5 hours at 95° C. Thereafter, the mixture was cooled to 30° C. and the content of unconverted NCO groups was determined as 1.41% by weight, based on the polyurethane obtained. dilution was then effected with 200 g of acetone, and 10.1 g of triethylamine (0.10 mol) and 410 g of water were stirred in. The content of urea groups was 0.09% by weight, based on the polyurethane. After distillation of the acetone, an aqueous polyurethane dispersion of about 40% strength by weight was obtained.

Comparative Example 1

A mixture of 79.4 g of 2,4-diisocyanatotoluene (0.46 mol), 19.8 g of 2,6-diisocyanatotoluene (0.11 mol), 600 g of polypropylene glycol (OH number 56, 0.30 mol), 21.5 g of dimethylolpropionic acid (0.16 mol) and 0.1 g of dibutyltin dilaurate was reacted for 5 hours at 95° C. The mixture was then cooled to 30° C. and the content of unconverted NCO groups was determined as 1.25% by weight, based on the reaction mixture. Dilution was then effected with 970 g of acetone, and 11.3 g of triethylamine (0.11 mol) and 1,100 g of water were stirred in. After distillation of the acetone, an aqueous polyurethane dispersion of about 40% strength by weight was obtained. The polyurethane contained 0.8% by weight of urea.

Production of laminated films

Laminates were produced from different polymer films and an aluminum foil, and the peel strength was then determined as a measure of the bond strength.

Specifically, the polyurethane dispersion was applied to one side (in the case of the polyolefins the corona pretreated side) of the film, in an amount of 4 g/m² using a 0.2 mm roll coater. The coated films were dried with a hot-air blower for about 2 minutes and pressed with a further film in a roller press at 70° C. and 6.5 bar at a speed of 5 m/min.

After storage for 7 days at room temperature, the peel strength in N/cm of the laminated film was determined using a tensile test apparatus:

TABLE

| | Peel strengths in N/cm | | | | |
|---|---|---|---|---|---|
| | PETP/PE | PA/PE | PP/PE | Alu/PE | PETP/Alu |
| Example | 4.3 | 4.1 | 2.8 | 3.5 | 4.5 |
| Comparative Example | 2.2 | 2.5 | 0.9 | 2.7 | 1.6 |

Abbreviations:
PETB: Polyethylene terephthalate
PA: Polyamide
PE: Polyethylene
PP: Polypropylene
Alu: Aluminum Note:
The first-mentioned polymer film was coated and was pressed with the uncoated second-mentioned polymer film.

By treatment with boiling water, it was possible to separate the laminated films again. The different films can thus be recycled in separate processes.

We claim:

1. A method of adhesively bonding two substrates together, comprising the steps of:

applying an aqueous dispersion containing a polyurethane which contains less than 0.6% by weight, based on the polyurethane, of urea groups (Mg=56 g/mol)

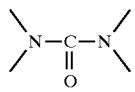

wherein said polyurethane consists essentially of
a) organic diisocyanates or a mixture of organic diisocyanate compounds having an arithmetic mean NCO functionality of from 1.9 to 2.3,
b) a polyether with two hydroxy groups having a molecular weight of from more than 500 to 5,000 g/mol and containing no ionic group or group convertible into an ionic group,
c) a dihydroxycarboxylic acid having 5 to 10 carbon atoms and the formula

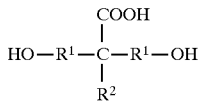

where $R^1$ is alkylene and $R^2$ is alkyl,
d) if required, dihydric alcohols having a number average molecular weight of from 62 to 500 or a mixture of alcohols, which mixture has an arithmetic mean functionality, based on OH groups, of from 1.9 to 2.3 and a number average molecular weight from 62 to 500 and which alcohols contain no ionic group or group convertible into an ionic group, and
e) if required, monohydric polyether alcohols,
wherein the number of OH equivalents in components b), c), d) and e) to the total number of equivalents of said NCO functionality in component a) is from 0.94:1 to 1.02:1,
to at least one substrate of said two substrates; and
contacting said two substrates to bond said substrates together.

2. A method as claimed in claim 1, wherein one of said two substrates is a polymer film and the other of said two substrates is selected from the group consisting of a polymer film, paper and cardboard.

3. A method as claimed in claim 1, wherein the total number of OH equivalents in components b), c), d) and e) to the total number of equivalents of said NCO functionality in component a) is 1:1.

4. A method as claimed in claim 1, wherein the total content of urea groups in said polyurethane does not exceed 0.3% by weight.

5. A method as claimed in claim 4, wherein the total content of urea groups in said polyurethane does not exceed 0.2% by weight.

6. An adhesively bonded article comprising two substrates adhesively bonded together by the method of claim 1.

7. A method of adhesively bonding two substrates together, comprising the steps of:
applying an aqueous dispersion containing a polyurethane which contains less than 0.6% by weight, based on the polyurethane, of urea groups (Mg=56 g/mol)

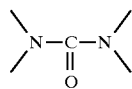

wherein said polyurethane consists essentially of
a) organic diisocyanates or a mixture of organic diisocyanate compounds having an arithmetic mean NCO functionality of from 1.9 to 2.3,
b) dihydroxy compounds having a molecular weight of from more than 500 to 5,000 g/mol and containing no ionic group or group convertible into an ionic group,
c) monohydric to trihydric alcohols which additionally contain an ionic group or a group convertible into an ionic group,
d) if required, dihydric alcohols having a number average molecular weight of from 62 to 500 or a mixture of alcohols, which mixture has an arithmetic mean functionality, based on OH groups, of from 1.9 to 2.3 and a number average molecular weight from 62 to 500 and which alcohols contain no ionic group or group convertible into an ionic group, and
e) if required, monohydric polyether alcohols, wherein the number of OH equivalents in components b), c), d) and e) to the total number of equivalents of said NCO functionality in component a) is from 0.94:1 to 1.02:1, to at least one substrate of said two substrates; and contacting said two substrates to bond said substrates together, wherein one of said two substrates is a film selected from the group consisting of a polyolefin, polyamide, polyester, PVCs, cellulose acetate, cellophane and metal films.

8. A method as claimed in claim 7, wherein one of said two substrates is a polyolefin film and said polyolefin film is a polyethylene or polypropylene film.

9. A method as claimed in claim 8, wherein one of said two substrates is biaxially oriented polypropylene.

10. A method as claimed in claim 7, wherein said two substrates are polyethylene terephthalate and polyethylene.

11. A method as claimed in claim 7, wherein said two substrates are polyamide and polyethylene.

12. A method as claimed in claim 7, wherein said two substrates are polypropylene and polyethylene.

13. A method as claimed in claim 7, wherein said two substrates are aluminum and polyethylene.

14. A method as claimed in claim 7, wherein said two substrates are polyethylene terephthalate and aluminum.

* * * * *